Oct. 7, 1969   E. A. VERRINDER   3,471,038
STACK LOADING DEVICE
Original Filed Dec. 26, 1962   12 Sheets-Sheet 1
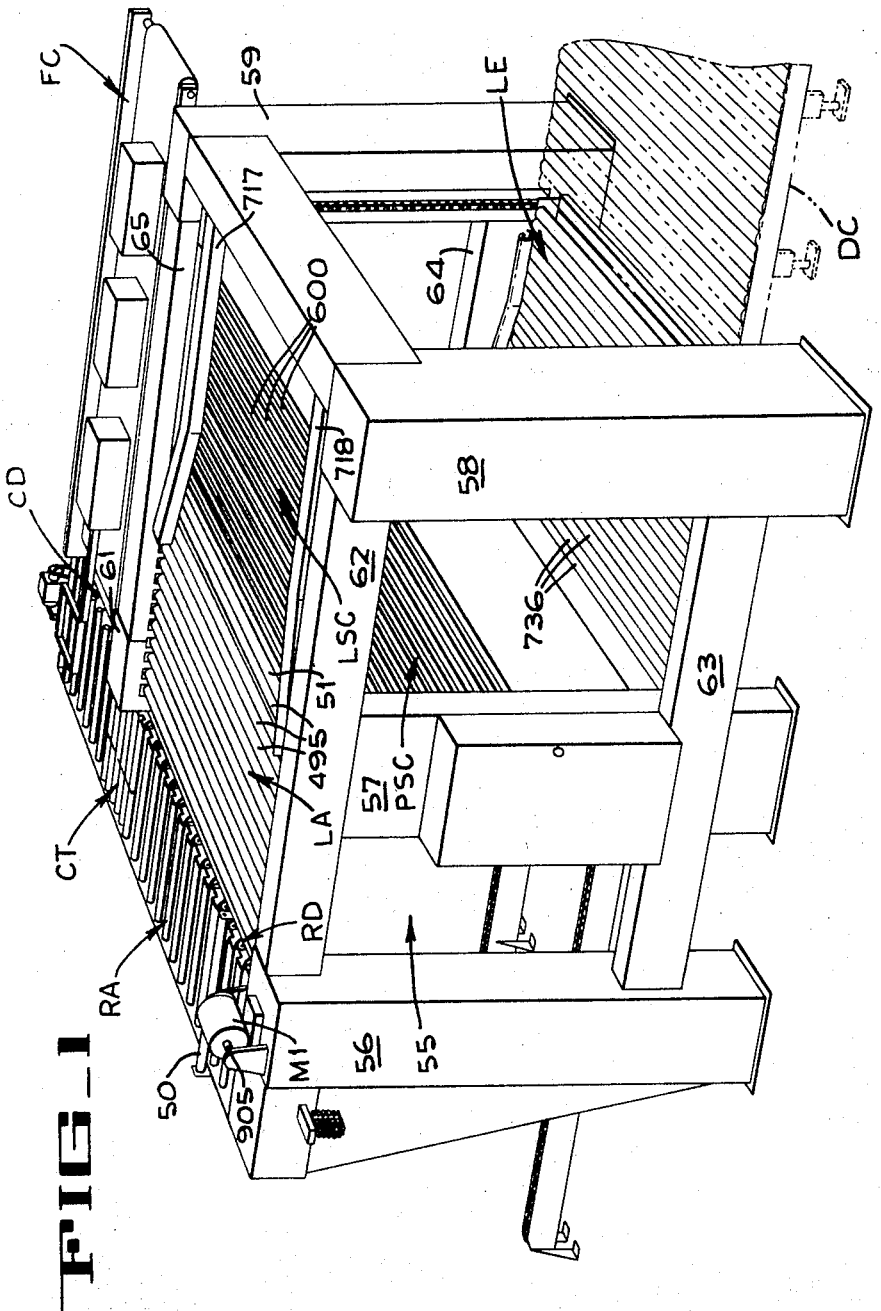
FIG_1
INVENTOR
ERNEST A. VERRINDER
BY
F. W. Anderson
C. E. Tripp
ATTORNEYS

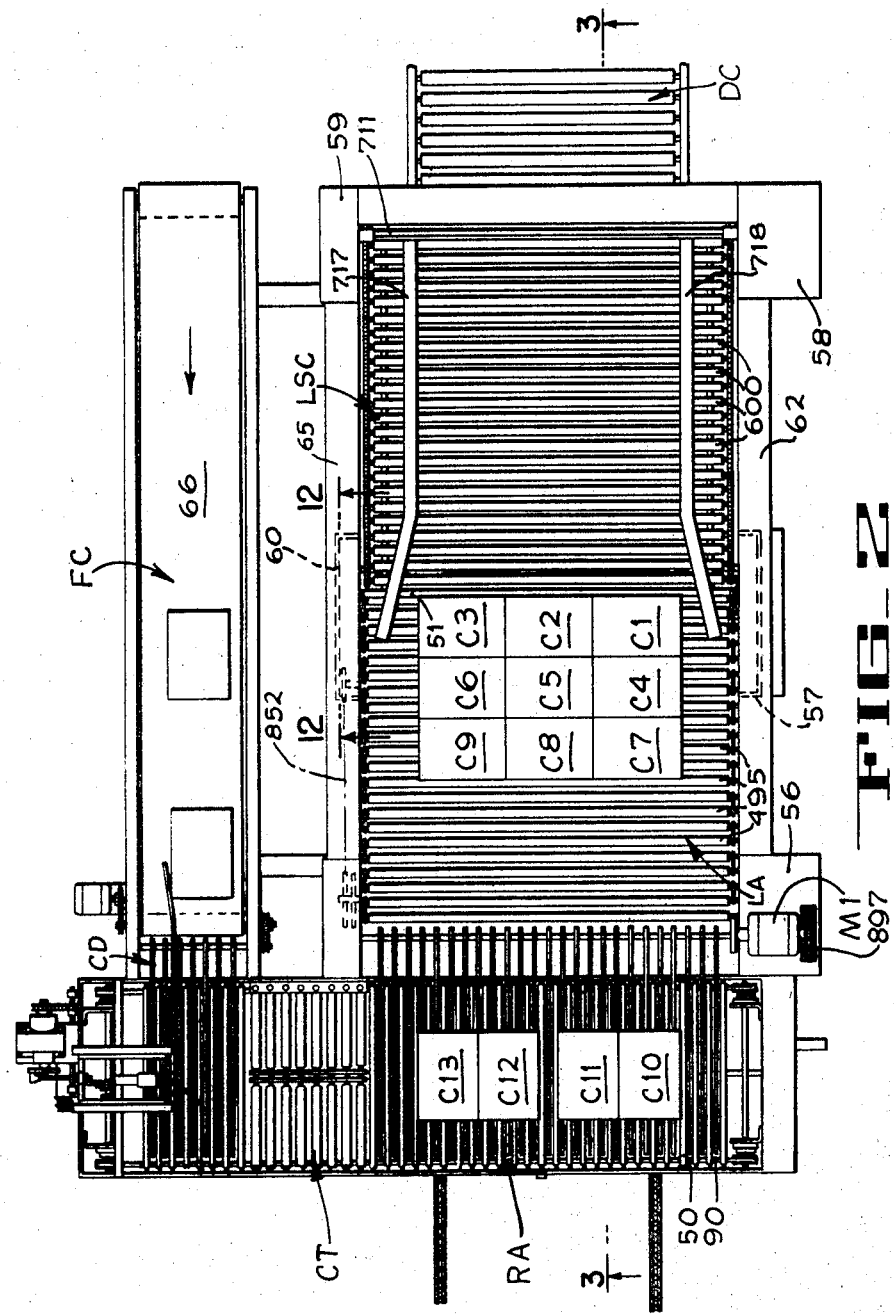

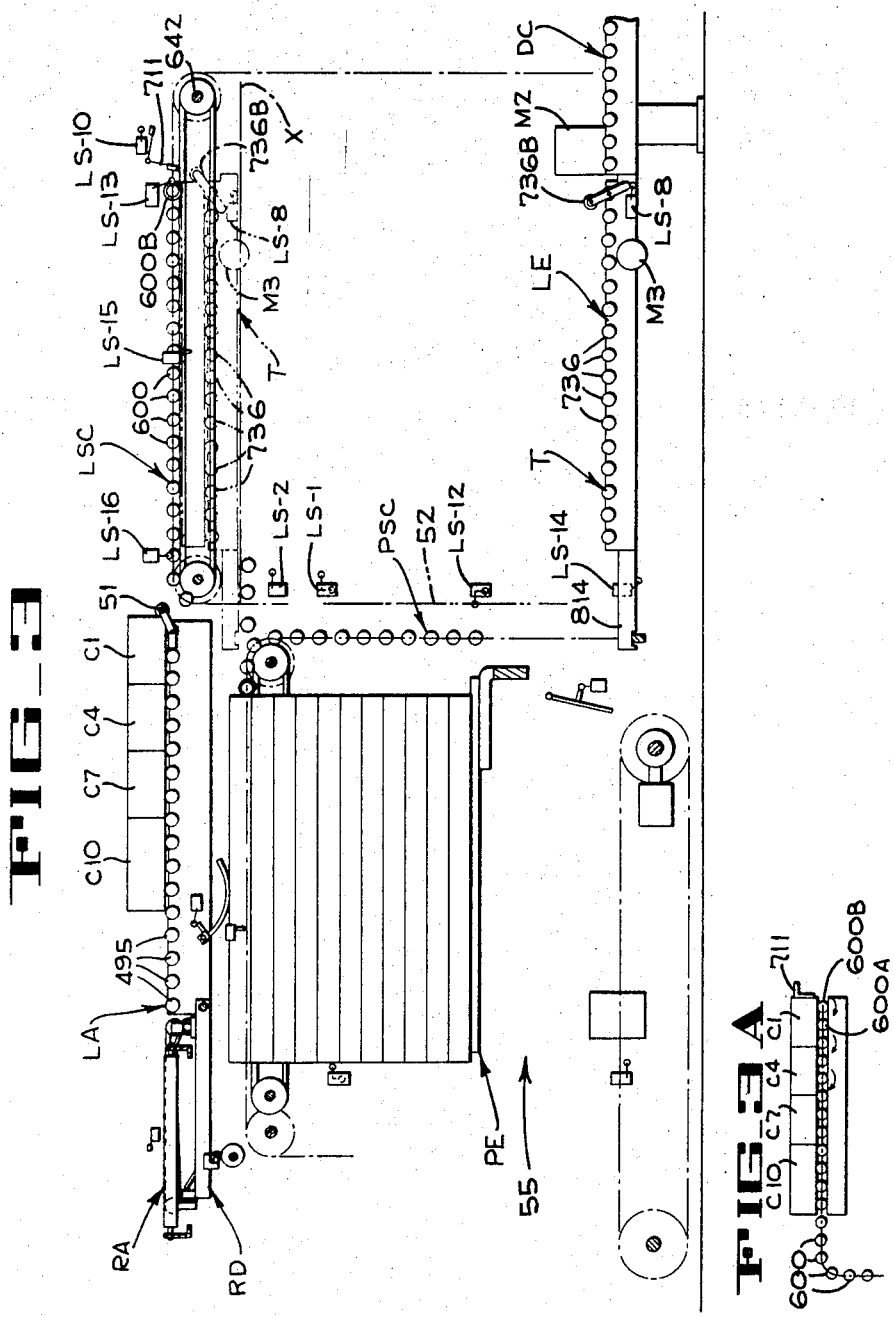

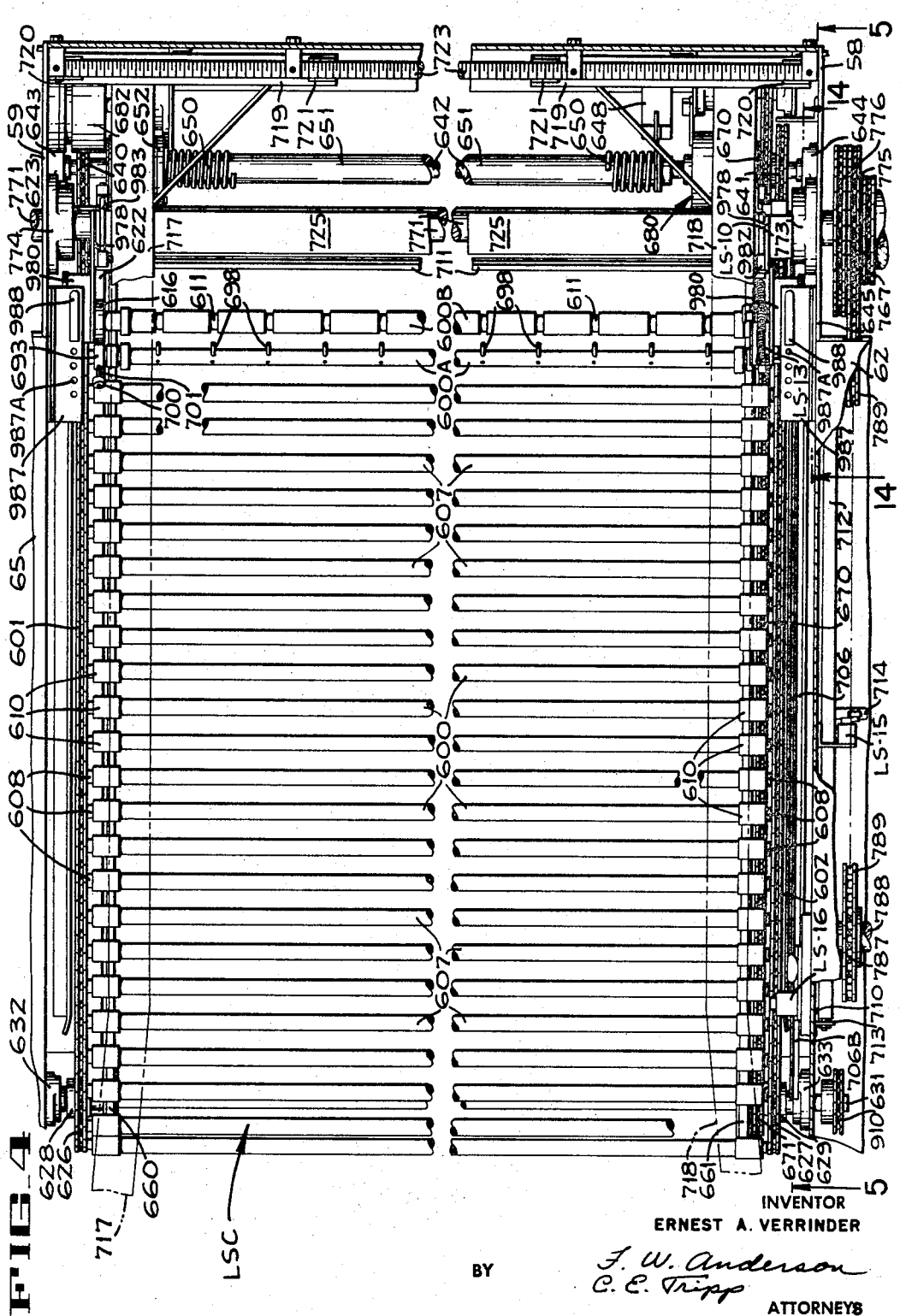

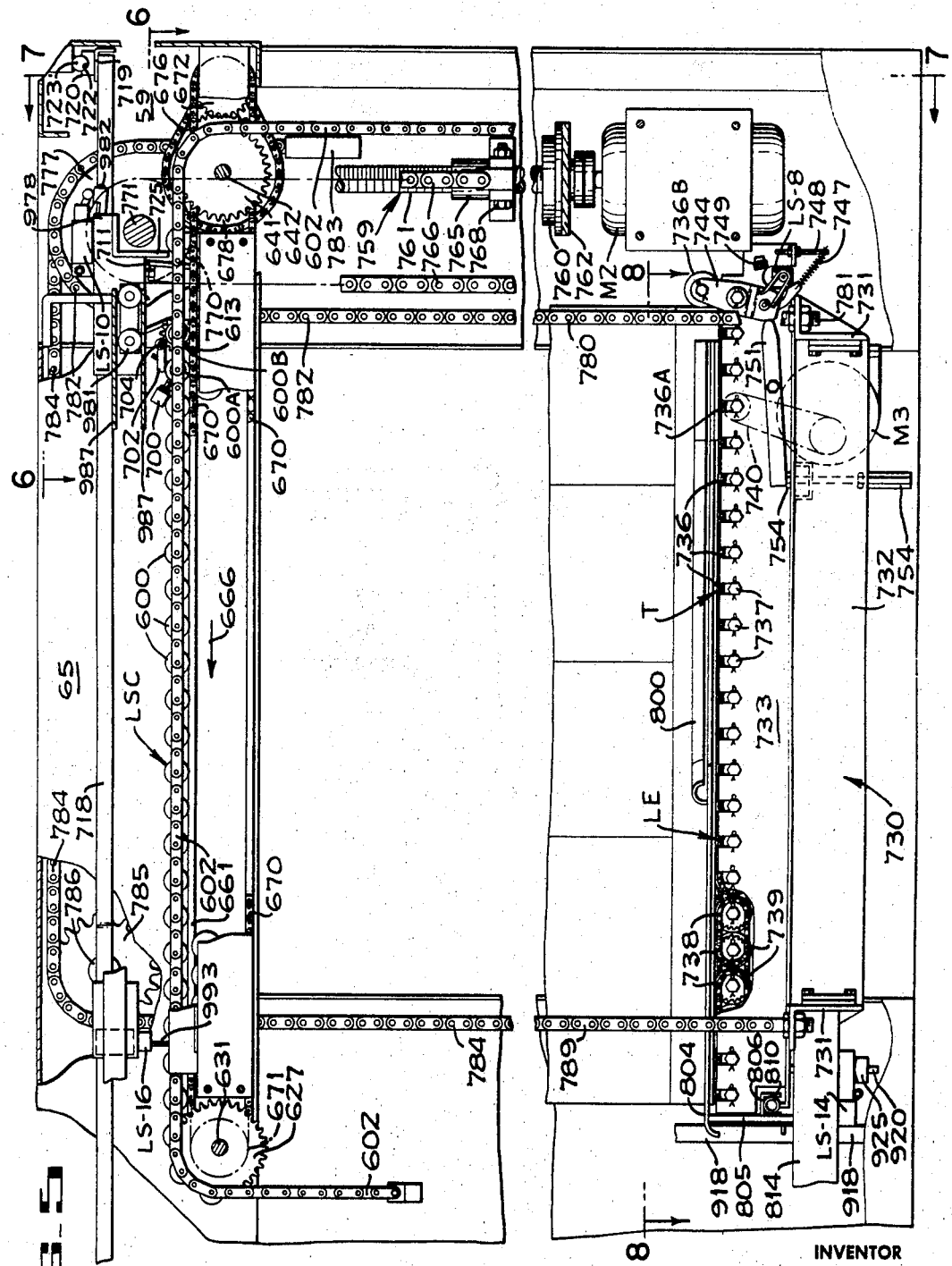

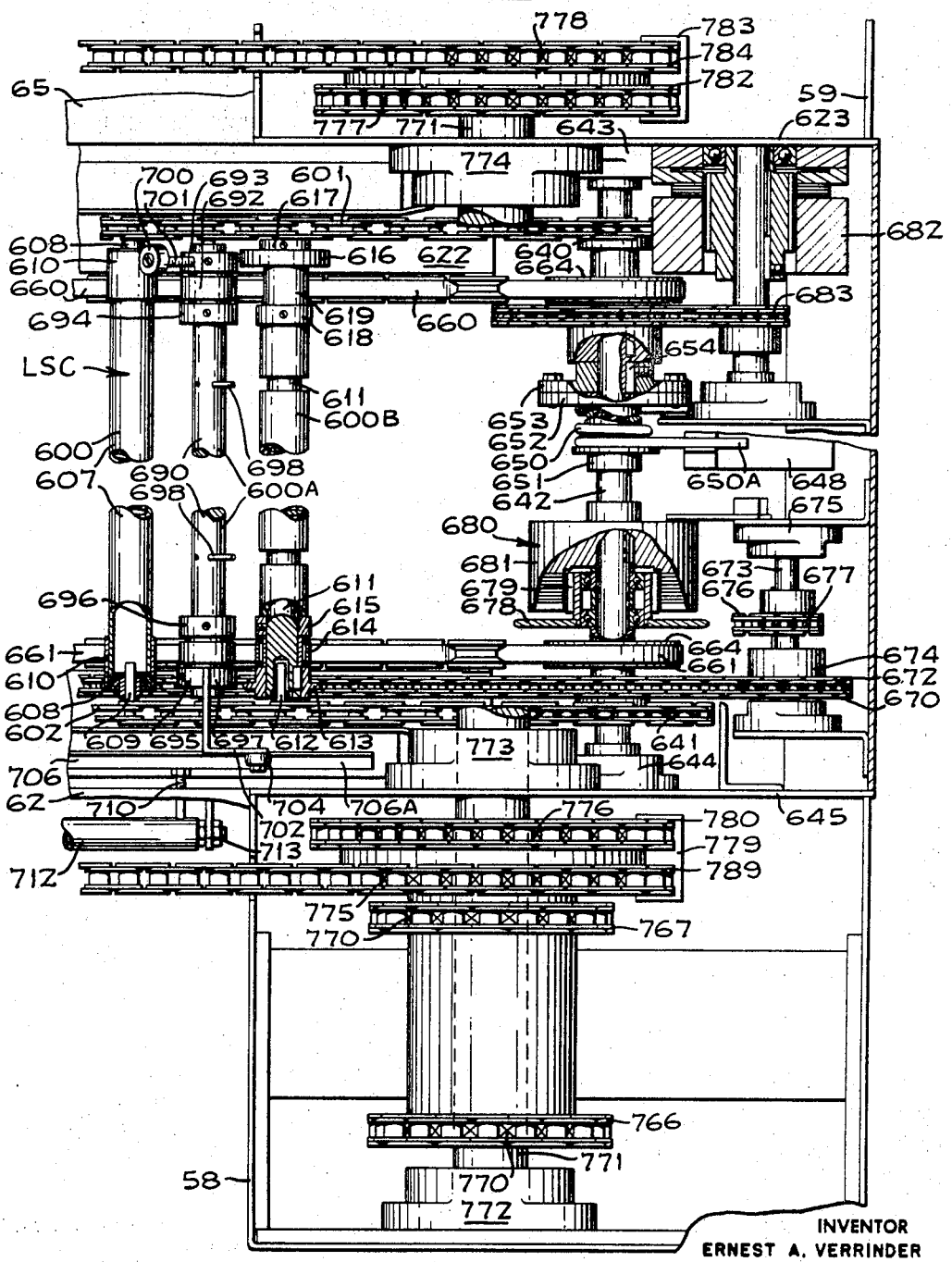

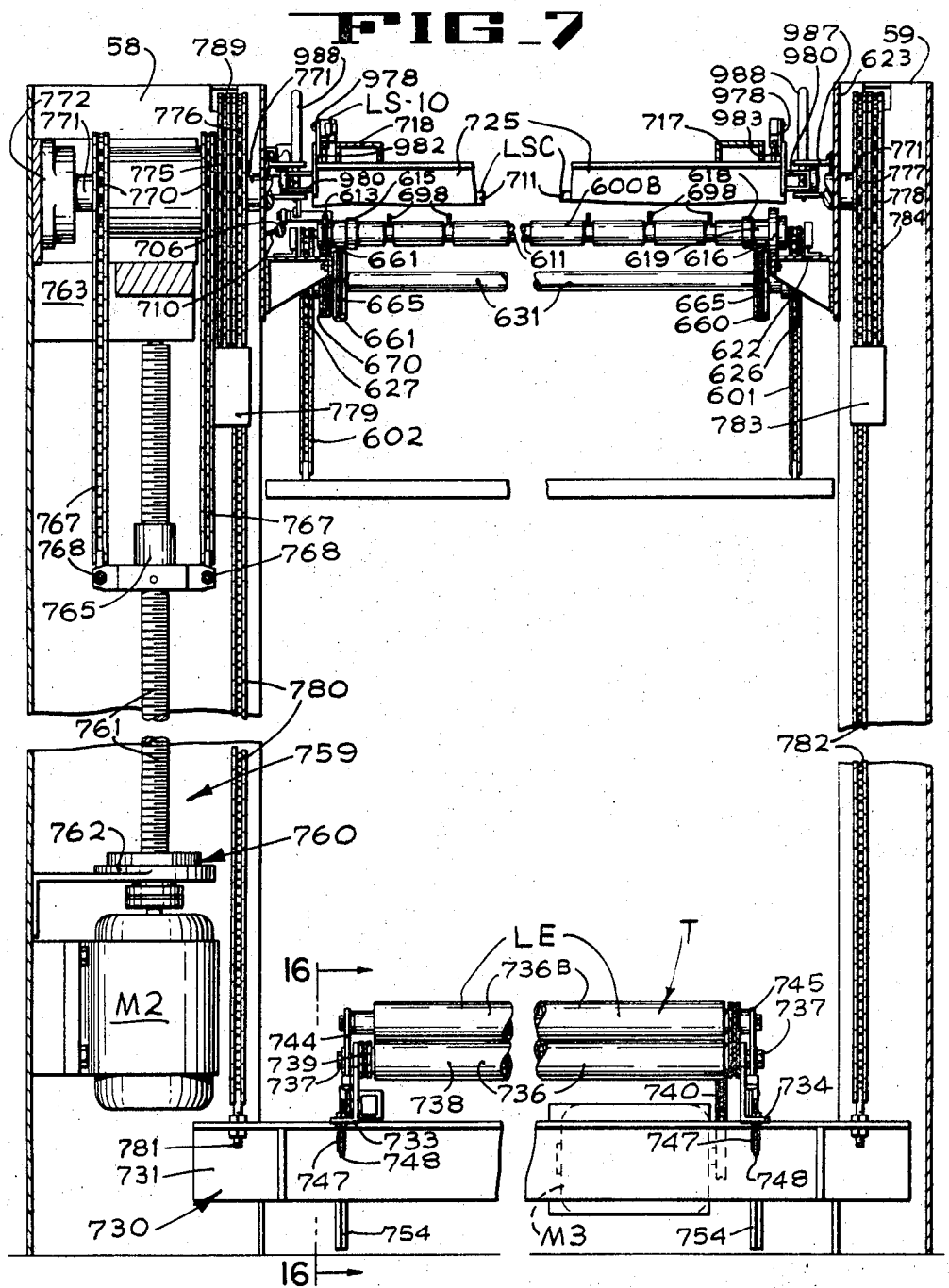

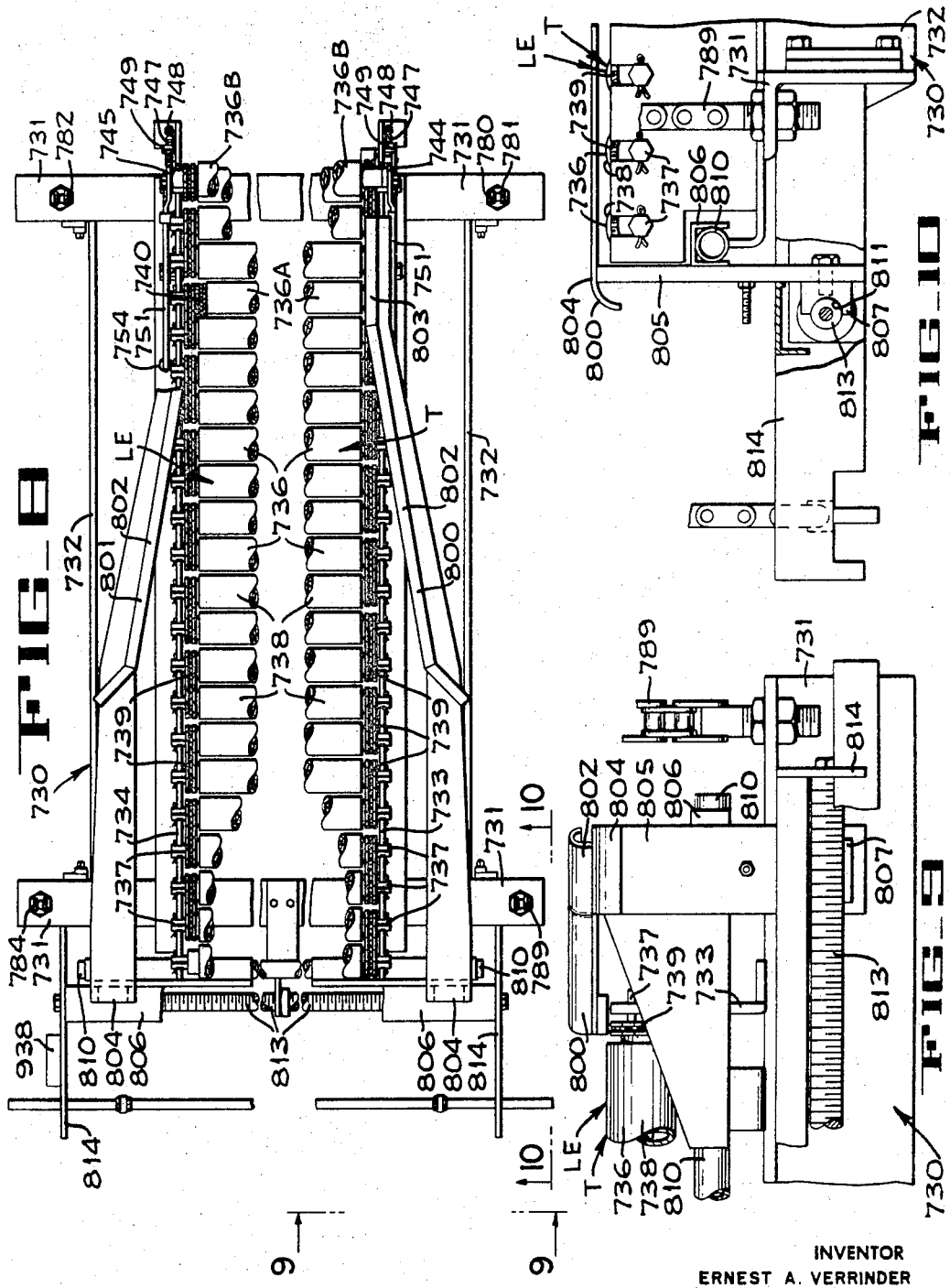

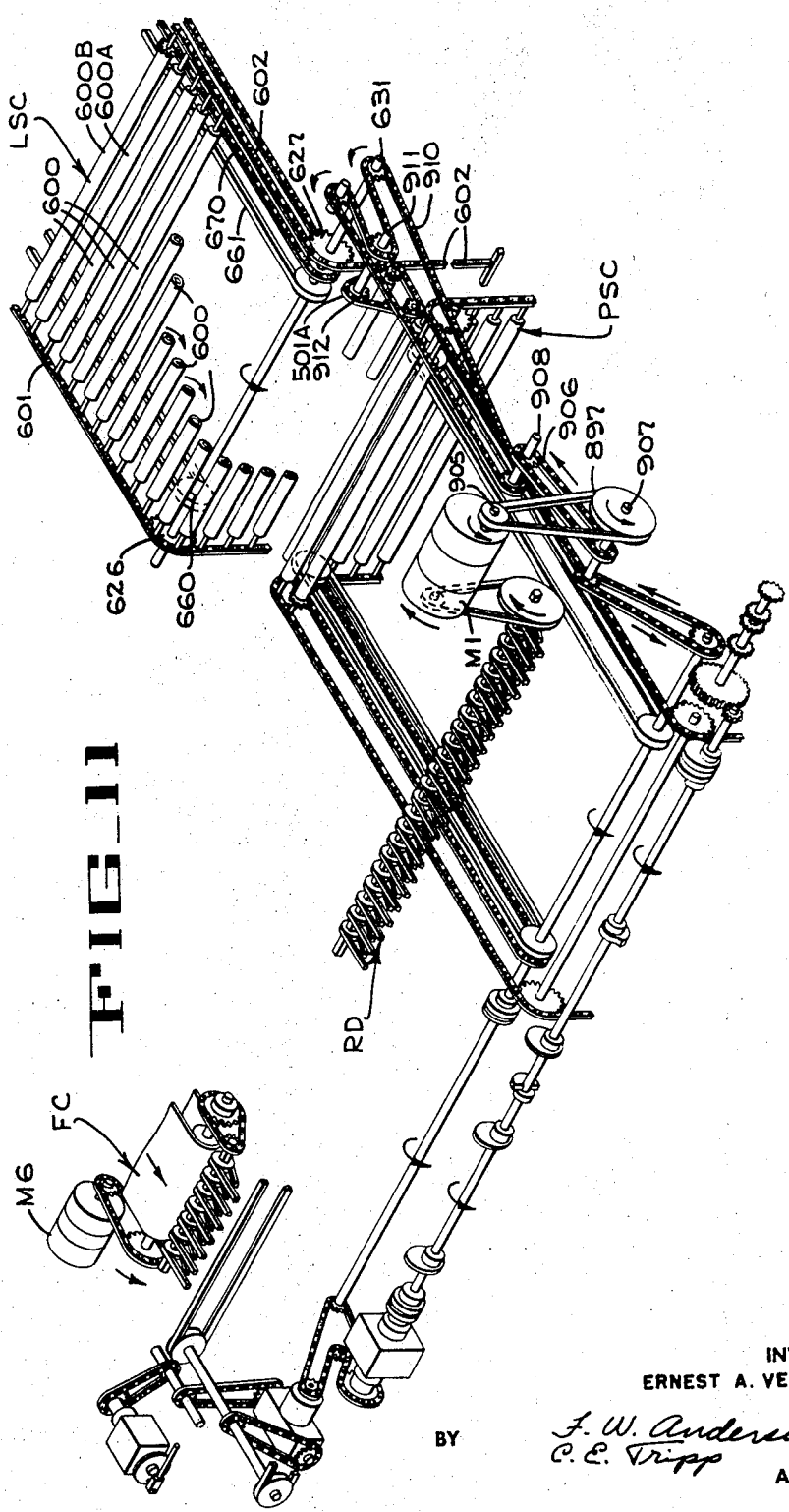

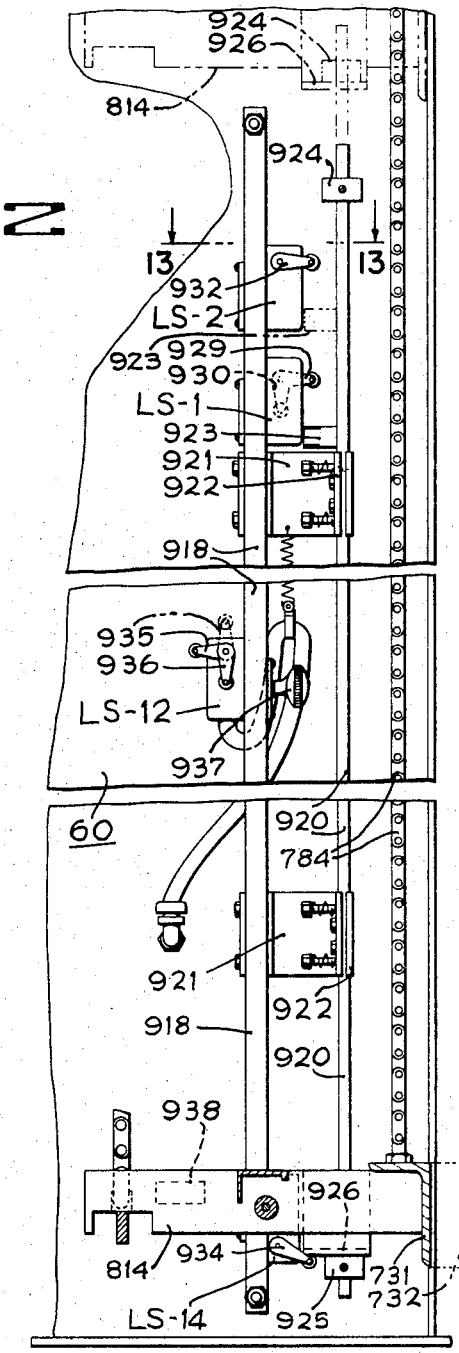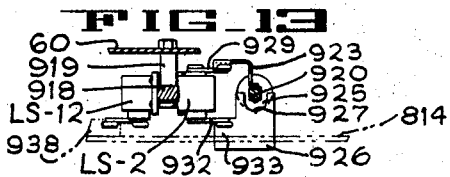

Oct. 7, 1969  E. A. VERRINDER  3,471,038
STACK LOADING DEVICE
Original Filed Dec. 26, 1962  12 Sheets-Sheet 11
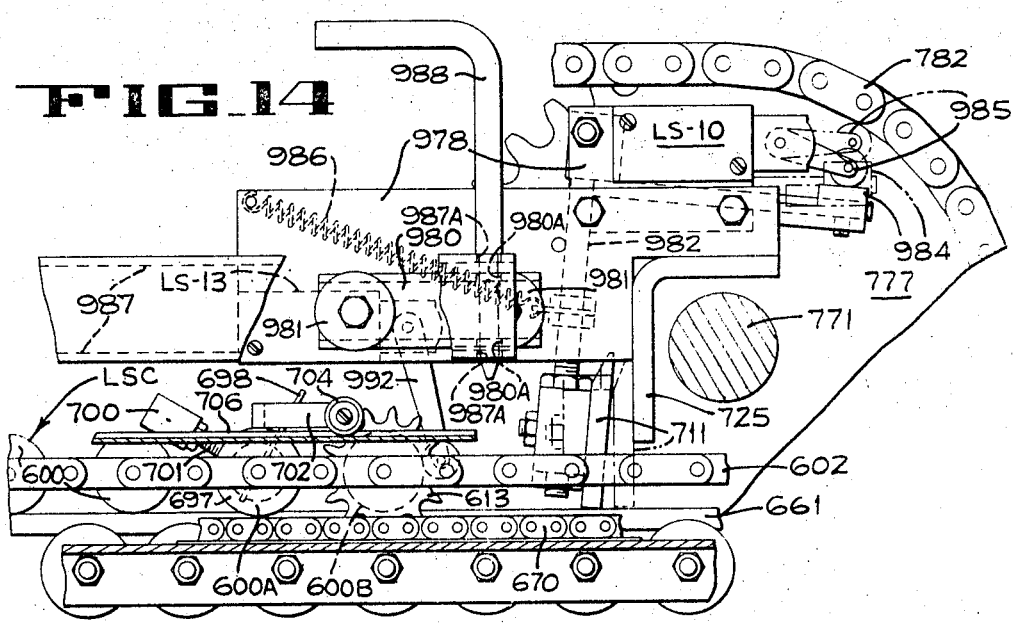
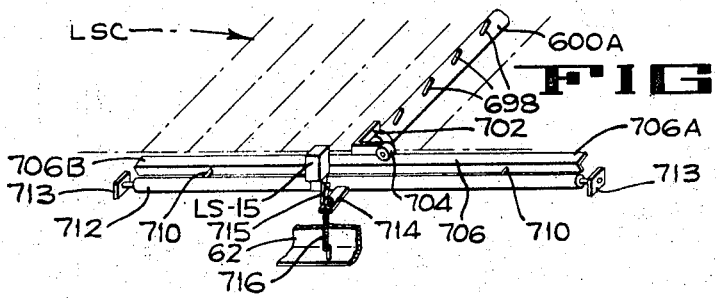
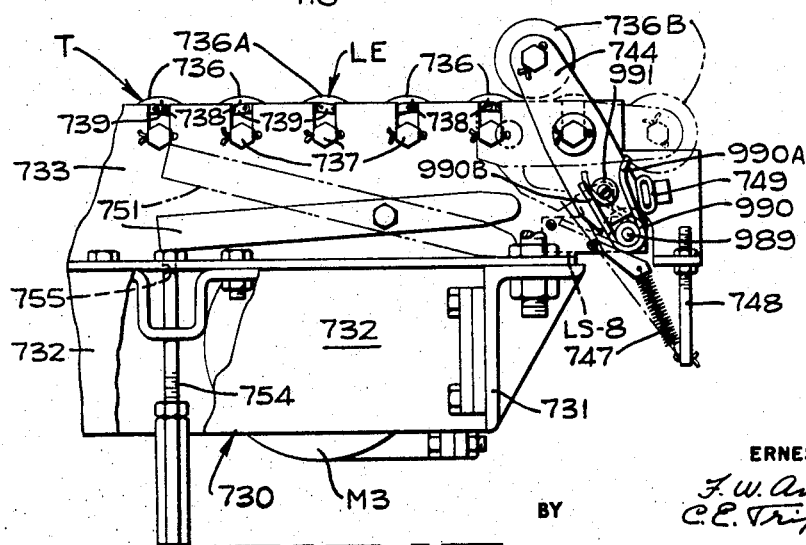
INVENTOR
ERNEST A. VERRINDER
BY
ATTORNEYS

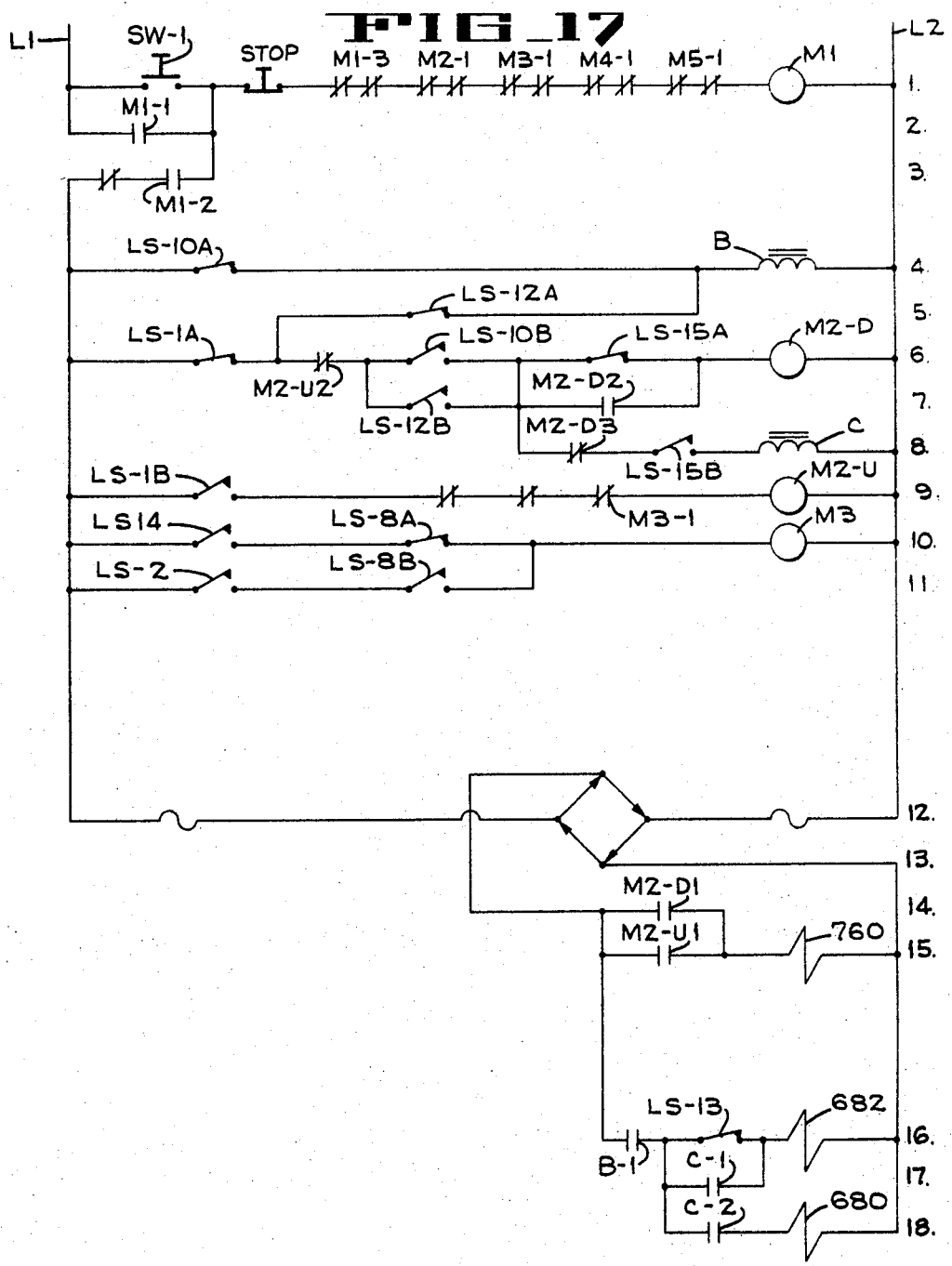

United States Patent Office 3,471,038
Patented Oct. 7, 1969

3,471,038
STACK LOADING DEVICE
Ernest A. Verrinder, Riverside, Calif., assignor to FMC Corporation, San Jose, Calif., a corporation of Delaware
Application Sept. 20, 1965, Ser. No. 511,000, now Patent No. 3,420,385, dated Jan. 7, 1969, which is a division of application Ser. No. 247,081, Dec. 26, 1962, now Patent No. 3,252,594, dated May 24, 1966. Divided and this application Apr. 26, 1968, Ser. No. 740,015
Int. Cl. B65g 57/00
U.S. Cl. 214—6     4 Claims

ABSTRACT OF THE DISCLOSURE

A stripper carriage comprising a plurality of rollers interconnected by a pair of flexible chains is positioned in a pallet loading machine structure to receive an assembled layer of cases. The rollers are rotated to propel the layer of cases forwardly onto the carriage. When the layer reaches an abutment at the forward end of the carriage, the rollers continue to turn and the carriage is driven rearwardly from beneath the cases to deposit the entire layer upon an underlying pallet. Sensing fingers on one of the rollers cause that roller to rotate only when the cases have been removed therefrom to actuate a switch that stops the rearward drive of the carriage and permits it to be returned to its layer receiving position.

Cross-reference to related applications

This application is a division of Ser. No. 511,000, filed Sept. 20, 1965, now Patent No. 3,420,385, granted Jan. 7, 1969, which was a division of Ser. No. 247,081, filed Dec. 26, 1962, now Patent No. 3,252,594, granted May 24, 1966.

This invention pertains to stack loading apparatus and more particularly to a stripper carriage for receiving and depositing successive layers of articles upon an underlying pallet or similar structure.

FIGURE 1 is a diagrammatic perspective of an article handling apparatus which includes the layer stripping device of the present invention.

FIGURE 2 is a diagrammatic plan of the machine of FIG. 1.

FIG. 3 is a diagrammatic vertical section taken substantially on line 3—3 of FIG. 2.

FIGURE 3A is a fragmentary schematic view showing a part of a layer stripping operation.

FIGURE 4 is a fragmentary diagrammatic plan of the layer stripping zone of the machine shown in FIG. 1.

FIGURE 5 is a fragmentary diagrammatic vertical section taken on line 5—5 of FIGURE 4.

FIGURE 6 is an enlarged, diagrammatic horizontal section taken on line 6—6 of FIG. 5.

FIGURE 7 is a fragmentary vertical section taken on line 7—7 of FIG. 5.

FIGURE 8 is a fragmentary horizontal section taken on lines 8—8 of FIG. 5.

FIGURE 9 is an enlarged vertical section taken on line 9—9 of FIG. 8.

FIGURE 10 is an enlarged vertical section taken on line 10—10 of FIG. 8.

FIGURE 11 is a diagrammatic perspective of a portion of the drive mechanism of the machine of FIG. 1.

FIGURE 12 is an enlarged, vertical section taken substantially on line 12—12 of FIG. 2.

FIGURE 13 is a horizontal section taken on line 13—13 of FIG. 12.

FIGURE 14 is an enlarged fragmentary vertical section taken substantially on line 14—14 of FIG. 4.

FIGURE 15 is a schematic perspective of one of the electrical control switches used in the present machine.

FIGURE 16 is an enlarged fragmentary vertical section taken substantially on line 16—16 of FIGURE 7.

FIGURE 17 is a circuit diagram for a portion of the electric control circuit of the machine.

The embodiment of the palletizing machine that is illustrated in FIGURES 1 and 2 comprises a feed conveyor FC arranged to deliver articles, such as cases, one-by-one to a case diverter conveyor CD which moves each article laterally onto a case turner conveyor CT. In order to form a stable layer of cases, certain of the cases must be turned while passing over case turner CT to an orientation at right angles to the orientation they had on the feed conveyor FC. In FIG. 2 it will be seen that cases C1–C9 have been turned 90 degrees while cases C10–C13 have their original orientation. After leaving the case turner, the cases are assembled in a row on a row accumulator conveyor RA, the leading case being in abutting contact with a rotatable stop roller 50, mounted at a fixed position on the conveyor, When a row of cases has been assembled, it is raised off the row accumulator RA and conveyed onto a layer accumulator conveyor LA by a row diverter conveyor RD which has elevatable conveying elements disposed between the rollers of the row accumulator RA. A layer of cases, made up of several rows is assembled on conveyor LA, the leading row abutting the retractible stop roller 51. When a layer has been formed, the roller 51 is retracted permitting the layer of cases to move onto a layer stripper carriage LSC (FIGS. 2 and 3) which is in the form of a flexible chain made up of elongate rollers and is arranged to move from the generally horizontal, layer-receiving position shown in full lines in FIG. 3 to the generally vertical retracted position indicated by phantom reference line 52. As the carriage moves toward the retracted position, the layer of cases is dropped onto a pallet that is resting on a load elevator LE which is, at that time, in the phantom line position of FIG. 3.

After each layer of cases is formed in the machine and deposited on the pallet or on a layer of cases that was previously placed on the pallet, the load elevator is lowered a distance equal to the height of the layer so that another layer can be positioned thereon. When a load consisting of the desired number of layers of cases has been formed on the pallet, the load elevator LE is lowered to a position in alignment with a discharge conveyor DC which carries the loaded pallet out of the machine.

When the loaded pallet has been removed from the machine, the elevator LE is raised to a position wherein the upper surfaces of rollers, forming the support surface of the elevator, are at substantially the same level, indicated by reference line X in FIG. 3, as the upper surfaces of rollers of a pallet stripper carriage PSC which is disposed within the support structure of the machine below the layer accumulator conveyor LA. The carriage PSC is a flexible roller chain similar to layer stripper carriage LSC and is arranged to remove the uppermost pallet from a stack of pallets on a pallet elevator PE in a pallet storage chamber 55 and move it onto the adjacent load elevator LE. After receiving the empty pallet, the elevator LE is raised to the layer-receiving position, indicated is phantom lines in FIG. 3, preparatory to receiving successive layers from the stripper carriage LSC.

In general, the support structure may be constructed of conventional rigid structural members secured together to provide a rigid frame adapted to support the several mechanisms of the machine. In the present embodiment the structure comprises a plurality of vertical members 56–61 which are box-like in construction in that they are made up of vertical plates welded together. These vertical members, which will be referred to as support posts, are interconnected by horizontal box-like members 62, 63, 64 and 65 which will be referred to as box beans.

The layer stripper carriage LSC comprises a plurality of rollers 600 (FIGS. 4 and 6) carried by two spaced chains 601 and 602. Each roller, except the leading rollers 600A and 600B (FIG. 6), includes a tubular outer member 607 having a bearing unit 608 pressed in each end. A pin 609, which is integrally formed as part of a link of the adjacent chain, has an end portion carried by the inner race of the adjacent bearing unit. Accordingly, as each roller is advanced by the chains, it is free to rotate about its axis which of course, coincides with the axis defined by the associated pins 609. Each roller has a cylindrical drive sleeve 610 fixedly secured, as by welding, on each of its ends. The leading roller 600B comprises a center shaft 611 having a recess which receives a pin 612 that is carried by the adjacent chain 601 or 602 and is rotatably mounted in a small ball bearing unit in the end of the roller. A sprocket 613 is keyed to one end portion of the shaft 611, and a roller bearing unit 614 is locked in position on shaft 611 adjacent sprocket 613 by a set collar 615. At the other end of shaft 611, a support roller 616 is held in position by set collars 617 and 618, alongside a spacer 619, that is smaller in diameter than the drive sleeves 610 of the rollers 600. The support roller 616 supports one end of the shaft 611 by its slidable engagement with the upper surface of an angle bar 622 (FIG. 7) which is secured to a vertical wall member 623 of support post 59.

At the entrance end of the layer stripping zone, the chains 601 and 602 are trained around sprockets 626 and 627, respectively, (FIG. 4) that are mounted on bearing units 628 and 629. The units 628 and 629 are disposed on a shaft 631 which is rotatably mounted in bearing assemblies 632 and 633 secured to a vertical wall of beam 65 and to a vertical wall of beam 62. At the downstream end of the layer stripping zone, the chains 601 and 602 are trained over sprockets 640 and 641, respectively, both of which are keyed to a shaft 642 that is rotatably journalled in bearings 643 and 644 carried by the vertical wall member 623 and a vertical wall member 645 of the support post 58, respectively. A torsion spring 650 is disposed on a sleeve 651 encircling shaft 642 and has one end 650A anchored in a fixed bracket 648 and the other end anchored in a circular plate 652 (FIG. 6) that is bolted to a plate 653 which is keyed at 654 to shaft 642. The spring is so arranged that it is effective to drive the shaft 642 clockwise (FIG. 5) tending to move the chains 601 and 602, and the rollers carried thereby, to the position indicated in FIG. 5 overlying the load elevator LE.

The rollers 600 of the stripper carriage are rotated by means of two belts 660 and 661 (FIG. 4) which are disposed on opposite sides of the layer stripping zone, the belt 660 being disposed below and in frictional engagement with the drive sleeves 610 at one end of the rollers and belt 661 being in frictional driving engagement with the sleeves 610 at the other end of the rollers. Each of the belts is trained around a pulley 664 (FIG. 6), which is mounted for free rotation on shaft 642, and around a pulley 665 (FIG. 7) that is keyed to shaft 631. As will be explained presently, during the layer stripping operation, the shaft 631 is arranged to be driven in a counterclockwise direction (FIG. 5) to move the upper run of the belts 660 and 661 in the direction of arrow 666.

The leading roller 600B (FIG. 4) is positively driven by an endless chain 670 that is trained around a sprocket 671 which is keyed to shaft 631 and around a sprocket 672 (FIG. 6) which is keyed to a short shaft 673 journalled in fixedly mounted bearings 674 and 675. A chain 676 is trained around a sprocket 677 on shaft 673 and around a sprocket 678 that is rotatably mounted on shaft 642 and is carried by the drive element 679 of a magnetic clutch 680. This clutch may be of the type that is commercially identified as Fawick Magnetic Clutch SC–550. The driven member 681 of the clutch is keyed to shaft 642. It will be evident that when the shaft 631 is rotated, the chain 670 will rotate the leading roller 600B and, if the magnetic clutch is energized at this time, the shaft 642 will also be driven. A magnetic brake 682 is connected to the shaft 642 by a chain and sprocket drive 683. The brake may be a Fawick Magnetic Brake SB–650 and is arranged to stop rotation of shaft 642 when it is de-energized.

The second roller 600A comprises a center shaft 690 having a roller bearing unit 692, at one end locked in place between set collars 693 and 694 that are secured to shaft 690, and a bearing unit 695 at the other end locked in place between set collars 696 and 697 that are also secured to shaft 690. A plurality of radially extending case-sensing fingers 698 are secured in the roller 600A to project radially outwardly from the surface of the roller. A weight 700 is adjustably mounted on a stud 701 projecting radially from set collar 693, and, at the opposite end of shaft 690, a bent support arm 702 is secured to the set collar 697. A roller 704 is rotatably mounted on the end of support arm 702 overlying an elongate angle plate 706 which extends along practically the entire length of the stripping zone, having a forward end 706A (FIG. 6) adjacent the shaft 642 and a rearward end 706B (FIG. 4) adjacent the shaft 631. The plate 706 is supported on a plurality of studs 710 (FIGS. 4, 6 and 7) which are adjustably secured to the plate and to a tube 712 that is rotatably journalled in mounting arms 713 projecting from a wall of box beam 62. As will be explained further hereinafter when the second roller 600A of the stripper carriage is rotated, due to the engagement of the fingers 698 by the leading row of cases of a layer of cases being advanced onto the stripper carriage by the accumulator conveyor, the roller 704 on bent arm 702 engages the elongate angle plate 706 and pivots it clockwise (FIG. 7) to swing an actuator arm 714 (FIG. 4) which extends radially from the tube 712 into engagement with a switch arm 715 to actuate a switch LS15 that is mounted on a side wall of box beam 62. A spring 716 (FIG. 15) which is connected to the actuator and to a horizontal wall member of beam 62, is stretched as the switch actuator arm 714 is swung upwardly. Subsequently, when the cases are removed from the fingers 698, the spring swings the arm 714 counterclockwise (FIG. 15), causing the plate 706 to raise the roller 704 and the bent support arm 702, whereby the roller 600A is rotated counterclockwise to return the fingers 698 to generally upright, case-intercepting position.

Referring to FIG. 3A, it will be noted that the rollers 600 and 600A are rotated clockwise to bring the layer of cases into contact with a stop bar 711 which is part of a switch mechanism that will be described more fully presently. When the layer of cases has been stopped, continued clockwise rotation of the rollers causes the stripper carriage to walk out from under the cases due to the engagement of the rollers with the under surfaces of the cases. Accordingly, the cases are dropped, row by row onto the pallet therebelow.

Referring to FIG. 2, it will be noted that two guide bars 717 and 718 are disposed at the forward end of the machine. These bars are close to the upper surface of the layer stripper carriage LSC when the carriage is in its forward position, ready to receive a layer of cases from the layer accumulator LA. The rearward end of each bar is inclined outward so that cases entering between the bars will be cammed inwardly, and accordingly, the final width of the layer will correspond to the distance between the bars. With this arrangement, there is no necessity for extreme accuracy in stopping the cases on the row accumulator. For example, the position of the case-intercepting bar that stopped case C12 (FIG. 2) is not critical since, if the gap created between cases C11 and C12 is greater than the desired gap, the guide bars will reduce the gap when they compress the layer as it moves onto the stripper carriage. Another obvious advantage of the guide bars resides in their ability to accurately position the layer above the pallet on which it is to be deposited and, due to the fact that the bars are mounted for adjusting movement toward and away from each other the size of the layer can be made to conform to several sizes of pallets.

Each guide bar 717 and 718 (FIG. 4) is an inverted relatively shallow channel and member that is bolted at its forward end to a transverse angle bar 719. Two spaced blocks 720 and 721 are secured in fixed position on the upper surface of angle bar 719, each lock having a semicylindrical recess 722 (FIG. 5) in its upper surface. The walls of the recess 722 have ridges and grooves which correspond to the threads in a portion of an internally threaded tube so that, when the blocks 720 and 721 are raised into engagement with a threaded transverse rod 723 certain threads on the rod are received in the grooves on the blocks and the guide bar is thereby locked against movement transversely of the stripper carriage. It will be noted in FIG. 5 that, at a point a short distance rearwardly from its front end, the undersurface of each guide bar 717 and 718 rests on a transverse angle bar 725 which is part of an electrical switch structure to be described hereinafter. The bar 725 acts as a fulcrum whereby the relatively long rearward portion of the guide bar is effective to swing the short forward portion upwardly and thus maintain the locked engagement of the threaded rod 723 and the blocks 720 and 721. The position of each guide bar can be changed by pivoting it clockwise (FIG. 24) about the angle bar 725 to move the blocks out of engagement with the rod 723, and then sliding the guide bar laterally to the desired position.

The load elevator LE (FIG. 5) comprises a rigid frame 730 which includes two spaced transverse angle bars 731 and a pair of spaced longitudinal bars 732 (FIG. 8) all welded together to form a rigid member on the upper surface of which two spaced longitudinal angle bars 733 and 734 are bolted. A plurality of rollers 736 are mounted in and extend between said bars 733 and 734, to form a table I. The rollers have hexagonal inner shafts 737 (FIG. 5), tubular outer shafts 738, and short sprocket and chain drive units 739 at the ends of the shafts so that all shafts are simultaneously driven in the same direction of rotation. One of the rollers, indicated by reference numeral 736A in FIG. 5, is driven through a sprocket and chain drive 740 by a motor M3 that is mounted in the frame 730.

The leading roller 736B is not mounted directly on the angle bars 733 and 734 but is pivotally mounted thereon by two levers 744 and 745 (FIG. 7), each lever being pivotally secured to the adjacent angle bar by the hexagonal inner shaft of the roller 736 next behind the roller 736B. When no load is on the roller table as when the table is being elevated after having discharged a loaded pallet, springs 747 (FIGS. 5 and 7) which are connected between fixed stud bolts 748 and the ends of levers 744 and 745 pivot the levers counterclockwise until the ends of the levers abut fixed stops 749 and the roller 736B is in an elevated position. When the table is raised to a position to receive an unloaded pallet from the pallet stripper carriage PSC, a pallet is moved onto the table T and comes into contact with the raised roller 736B. The levers 744 and 745 are pivoted clockwise to the position shown in FIG. 5 wherein the lower ends of the levers abut latch levers 751 that are pivotally mounted on the angle bars 733 and 734 and are urged by gravity to a position wherein they engage the horizontal flanges of angle bars 733 and 734. Accordingly, while the pallet is being loaded and lowered step by step, the stop roller 736B is latched in the position shown in FIG. 5. When the pallet is loaded and is ready to be discharged from the machine, the elevator is moved to its lowermost position, causing bolts 754 to project through openings 755 (one only being shown) in the angle bars 733 and 734 and engage the latch levers 751. The latch levers are thus pivoted clockwise to release the levers 744 and 745. Then when the motor M3 is energized and the rollers 736 are driven the stop roller 736B will be swung down to a position wherein it forms a continuation of the roller table and permits the loaded pallet to be discharged from the machine.

The frame 730 and the roller table mounted thereon are raised and lowered by means of a lifting mechanism 759 which includes a motor M2 that is mounted in the vertical post 58. The power shaft of the motor is coupled to a vertical threaded shaft 761 which is journalled for rotation in spaced bearings 762 and 763. A magnetic brake 760, which may be of the same type as brake 682, is suitably mounted in the machine and adapted to stop rotation of shaft 761 when it is de-energized. An internally threaded block 765 is disposed on the threaded shaft 761, and two chains 766 and 767 are secured to the block by bolts 768 (FIG. 7). Each of the chains is trained around a sprocket 770 keyed to a shaft 771 which extends across the end of the machine and is journalled for rotation in bearings 772, 773 and 774 secured to vertical post 58 and to the vertical post 59. Four spockets 775, 776, 777 and 778 are keyed to shaft 771. A chain 780 is secured to one corner of the forward end of the table by a special bolt 781 (FIG. 7) and extends upwardly around the sprocket 776 and has a counterweight 779 secured to its end. Similarly, a chain 782 is connected to the other forward corner of the table, is trained around sprocket 777, and has a counterweight 783 secured to its end. A chain 784 (FIG. 5) is secured to one rear corner of the table and is trained around a sprocket 785 which is mounted on a short shaft 786 that is journalled in bearings (not shown) in the walls of box beam 65. The chain 784 extends forwardly from the sprocket 785, is trained around sprocket 778, and is connected to the counterweight 783. Similarly, a chain 789 (FIG. 4) is connected to the other rear corner of the table and is trained over a sprocket 787 that is keyed to a short shaft 788 journalled for rotation in bearings in the opposite walls of box beam 62. The chain 789 extends forwardly from the sprocket 787, is trained around sprocket 775, and is connected to the counterweight 779.

It will be evident that, when the motor M2 is operating, the block 765 will move up or down the shaft 761 and through the shaft 771 and the sprockets and chains associated with the shaft will raise or lower the table.

As previously mentioned, after a loaded pallet has been discharged from the machine, the table is raised to a predetermined position to receive an empty pallet from the pallet storage magazine. It is desirable that this empty pallet is centered directly under the layer of cases being positioned on the layer stripper carriage so that when the layer is dropped onto the pallet it will be properly centered thereon and so that the positioning of additional layers on the pallet will not cause an unstable load condition. To properly position the empty pallet on the table, two guide bars 800 and 801 (FIG. 8) are provided. Each bar has a slanted guide portion 802 and a portion 803 that is subtantially parallel to the longitudinal centerline of the table. The distance between the opposite portions 803 should, of course, be coordinated with the width of the pallet being used so that proper centering of the pallet will take place.

Each guide bar has a rearward end 804 (FIG. 10) welded to an upstanding float lever 805 which has a short inverted channel member 806 welded to one face and a locking block 807 bolted to its opposite face near its lower end. The channel 806 is disposed over a tubular bar 810 which is mounted in fixed position on the rear end of the table support frame 730. The locking block 807 has a semi-cyclindrical recess 811 in which ridges and grooves are formed corresponding to the threads on a portion of an internally threaded tube so that, when the block 807 is moved into engagement with a threaded transverse rod 813 that is secured between spaced arms 814 of the frame 730, the threads on the rod 813 will be engaged in the ridges and grooves of thee block, and the guide bar will be locked against laternal movement relative to the table. To unlock the guide bar, it is pivoted counterclockwise (FIG. 10) to disengage the block 807 from the threaded rod 813. The guide bar can then be adjusted toward or away from the centerline of the table. It will be evident that, since the guide bars 717 and 718 above the layer stripper and the guide bars 800 and 801 are all adjustable relative to the longitudinal centerline of the stripper carriage, the position of the layer of cases being formed and the position of the pallet onto which it is to be transformed can be effectively coordinated.

As shown in FIG. 11, motor M1 is a sterling gear motor having one output shaft 905 rotatable counterclockwise. The shaft 905 drives the shaft 631, which actuates the belts 660 and 661 and chain 670 that rotate the rollers 600 of the layer stripper carriage LSC, the shaft 905 being connected to shaft 631 by means of the belt and pulley drive 897, a chain 906 connecting shafts 907 and 908, and a chain 910 connecting shaft 908 with shafts 631 and 911. Shaft 911 carries a sprocket 912 around which the chain 501A that drives the rollers 495 of the accumulator conveyor is trained. It will therefore be evident that, when the motor M1 is energized, the rollers of the layer stripper carriage LSC will immediately start to rotate, as will the rollers 495 of the layer accumulator conveyor.

The electrical control circuit includes a plurality of limit switches that are located at particular areas of the machine to control certain operations. A switch LS–1 (FIG. 12) is mounted on a vertical bar 918 which is secured to a wall of the post 60 and is held in spaced relation to the wall by spacers 919 (one only being shown in FIG. 13). A rod 920 is slidably held in two spaced clamps 921 (FIG. 33), each of which is secured to the mounting bar 918 and has two plates 922 that frictionally grip the rod 920. A switch actuator 923 is secured to the bar 918 intermediate its ends and collars 924 and 925 are adjustably secured to opposite ends of the rod 920 in the path of movement of a plate 926 that is mounted on the arm 814 of the load elevator frame 730 that is adjacent column 60. The plate 926 has an arcuate recess 927 which is large enough to receive the rod 920 and the clamp plates 922 but not large enough to permit passage of either of the collars 924 or 925. Accordingly, during upward movement of the load elevator, the plate moves upwardly until it contacts and raises collar 924, causing switch actuator 923 to engage an arm 929 of switch LS–1. As the actuator continues upward, arm 929 is raised to a vertical position while an arm 930 is moved to a laterally projecting position. When the elevator is subsequently lowered, the plate 926 engages the lower collar 925, pulling the rod 920 downwardly and causing switch actuator 923 to engage switch arm 930 and swing it downwardly, returning arm 929 to its laterally projecting position.

A switch LS–2 is also mounted on vertical bar 918 and has an arm 932 in the path of vertical movement of a portion 933 of the plate 926. Accordingly, each time the load elevator LE is raised, the plate actuates switch LS–2. The switch LS–2 is of the type that is only actuated when the arm 932 is swung upwardly and therefore it is not actuated when the elevator descends.

A switch LS–14 is mounted on vertical bar 918 and has an arm 934 that is arranged to be engaged and actuated by the plate 926 when the load elevator is in its lowered position. The switch LS–14 is normally open and is only closed when contacted by plate 926.

A switch LS–12, which is adjustably mounted on bar 918, by a releasable clamp 937, is provided with two arms 935 and 936. During upward movement of the load elevator, a tab 938 that projects laterally from one of the arms 814 of the elevator frame contacts arm 935 and actuates the switch. As the elevator descends, the tab engages arm 936 and swings arm 935 to its original position.

A switch LS–10 (FIG. 4) is mounted at the forward end of the machine adjacent the forward end of the case guide bar 718. The actuator of this switch is the stop bar 711 which extends across the forward end of the machine in position to be engaged by the leading cases of a layer of case received from the layer accumulator. The bar 711 is mounted between two identical levers 982 and 983 (FIGS. 7 and 14) which are pivotally mounted on two spaced vertical plates 978. The vertical plates are secured to opposite ends of the angle bar 725 so that the two plates and the bar form a carriage on which the actuator bar is pivotally mounted. A switch contact member 984 is adjustably mounted on one arm of the lever 982 in position to engage an arm 985 of the switch LS–10. A channel 980 is welded to the outer surface of each plate 978, and two rollers 981 are rotatably mounted on each channel and adapted to roll along a track defined between two fixed spaced plates 987. A pair of vertically aligned apertures 980A are provided in each channel 980 and, by rolling the carriage along the guide track, apertures 980A can be aligned with one pair of a plurality of pairs of aligned apertures 987A in the spaced plates 987. At each side of the machine, a pin 988 is adapted to be inserted in the four aligned apertures to lock the carriage in fixed position. The provision of this adjustable stop bar makes it possible to position the forward edge of the layer of cases at a desired location relative to the forward and rearward edge of the pallet on which the layer is to be discharged. Obviously, the edge of the layer can be made to coincide with the edge of the pallet. Or, when the layer is not as long as the pallet, the layer can be centered on the pallet. When the advancing layer of cases engages bar 711, it swings lever 982 counterclockwise causing contact member 984 to actuate an arm 985 of switch LS–10 and close the contacts of the switch. When the layer of cases is dropped from the stripper carriage, it remains in contact with switch actuator bar 711 until the table is lowered. When the bar 711 is released by the cases, a spring 986 swings lever 982 clockwise, releasing switch arm 985, permitting the contacts of LS–10 to open.

A switch LS–8 (FIG. 16) is mounted on the inside face of the angle bar 733 of the load elevator table and has a rotary actuator member 989 which projects through an opening in the bar 733 and has a U-shaped clip 990 secured thereto. A button 991 secured to the lever 744 projects into the clip 990. When a loaded pallet is being discharged from the machine, the leading roller 736B is in the position shown in phantom lines. After the load has been discharged, the spring 747 swings arm 744 counterclockwise, causing the button to engage arm 990A of clip 990 and rotate the actuator 989 clockwise to open a set of normally closed contacts and close a set of normally open contacts. When the table has been raised to the position opposite the pallet stripper carriage and a pallet is moved onto the table, the pallet engages roller 736B and swings it clockwise, causing the button to engage 990B of clip 990. The rotary actuator 989 is thus rotated counterclockwise to close the normally closed contacts and open the normally open contacts.

A switch LS–13 (FIG. 4) is mounted at the forward end of the layer stripper zone just above the path of forward movement of the layer stripper carriage. This switch has an actuator 992 (FIG. 14) that extends downwardly into position to be engaged by the leading roller 600B of the stripper carriage. When the roller 600B engages and moves the actuator 992, normally closed contacts of the switch are opened.

As previously mentioned, switch LS–15 is mounted on a side wall of box beam 62 and is arranged to be actuated in response to a row of cases engaging the fingers 698 (FIG. 15) on the roller 600A of the layer stripper carriage. When cases are moved into engagement with the fingers, roller 600A is rotated clockwise, causing roller 704 to rotate tube 712 clockwise and swing switch actuator 714 upwardly to actuator the switch. As a result, a set of normal closed contacts are opened and a set of normally open contacts are closed. When the last row of cases is stripped from the carriage, the spring 716 pulls the actuator 714 downwardly, returning the contacts of the switch to their original position and rotating the carriage roller 600A to its original position.

A safety switch LS–16 (FIG 5) which may be adjustably mounted adjacent the rear end of the stripping zone, has an actuator 993 arranged to be engaged by the bent arm 702 carried by the carriage roller 600A. This switch is so located that it will not be actuated as long as layers of normal size are being formed and discharged by the stripper carriage. However, if a layer is extra long, the bent arm 702 will actuate the switch LS–16 and stop the entire machine before the stripper carriage travels too far rearwardly.

A cycle of operation of the aforedescribed mechanisms, starting with the operations that take place after a completed layer of cases is moved from the layer accumulator conveyor onto the layer stripper carriage will be described in connection with FIG. 3 and with the electrical control diagram of FIG. 17 wherein M1 is the main drive motor, M2–D indicates the windings of motor M2 that drive the load elevator LE down, M2–U indicates the windings of motor M2 that cause the load elevator to be elevated, and M3 is the drive motor for the table rollers 736.

At the start of this cycle the load table T will be considered to be in its uppermost position supporting a pallet directly beneath the layer stripper carriage which is holding the contacts of switch LS–13 open. When start switch SW–1 is closed the main motor M1 is energized through a circuit connected between lines L1–L2 which supply 115 volt A.C. current. An interlock M1–1 in circuit 2 keeps M1 energized. When motor M1 is energized the rollers 600 of the layer stripper carriage will be rotated clockwise (FIG. 3) and the rollers 495 of the layer accumulator conveyor LA will berotated clockwise. When the stop roller 51 of the layer accumulator is lowered and the layer of cases is advanced over the layer stripper carriage, the leading cases engage the actuator 711 of switch LS–10, opening contacts LS–10A in circuit 4 and closing contacts LS–10B in circuit 6. Also, the cases engage the radial fingers on the second roller 600A, causing LS–15 to be actuated, causing contacts LS–15A in circuit 6 to open and contacts LS–15B in circuit 8 to close, energizing relay C. When relay C is energized, contacts C–1 in circuit 17 close and the load stripper carriage brake 682 is energized, since normally open contact B–1 is closed due to the fact that relay B in circuit 4 is energized through contact LS–12A, contact LS–1A in circuit 6 having been closed by the load table when it reached its upper position. Therefore, the brake 682 is released and the clutch 680 through contact C–2 is energized to drive the layer stripper carriage rearwardly.

As the layer striper retracts, the layer of cases moves off the rollers causing switch LS–15 to be released, whereby contact LS–15A in circuit 6 closes and contact LS–15B in circuit 8 is opened to de-energized relay C. Contact C–2 in circuit 18 opens to de-energize the clutch 680 and permit the torsion spring on the layer stripper carriage to move the stripper toward the front of the machine. The brake 682 remains energized, allowing the shaft 642 to continue rotating, due the fact that switch LS–13 in circuit 16 was allowed to close as the stripper was retracted.

Since contacts LS–15A in circuit 6 are now closed, contacts LS–10B are still held closed by the layer of cases, and contacts LS–1A were closed during upward movement of the load elevator, motor windings M2–D are energized to start the elevator down.

As the elevator moves down, the cases release the actuator of switch LS–10, closing contacts LS–10A in circuit 4 and opening contacts LS–10B in circuit 6 to de-energize M2–D. The torsion spring then returns the stripper carriage to its position above the load elevator, the leading roller of the carriage contacting and opening switch LS–13 (circuit 16) to de-energize the brake and cause it to hold shaft 642 against rotation. Then the next layer of cases comes in and the layer discharging and elevator lowering operations are repeated.

When a predetermined number of layers are on the table, the tab 938 on the elevator engages LS–12 closing contacts LS–12B in circuit 7. The motor windings M2–D are then energized through contacts LS–1A, LS–12B, and LS–15A which are closed when the stripper is retracted, and the load elevator is lowered all the way to the bottom, since the contacts LS–10B in circuit 6, which are opened when the cases pass out of contact with LS–10, are bypassed. As the elevator reaches its lowered position, contacts LS–1A in circuit 6 are opened, de-energizing M2–D. Switch LS–14 in circuit 10 is also closed by the elevator in its lowered position and motor M3 is energized to rotate the rollers on the table to carry the loaded pallet out of the machine. As the load leaves the machine, the roller 736B is raised and the contacts LS–8A in circuit 10 are opened to de-energize motor M3.

To accommodate the operation of the machine at a high rate of cases per minute, a safety circuit has been provided which will stop the infeed cases while a load is being discharged and the load table is being raised to receive a pallet and position it under the layer stripper carriage. Contact LS–12A (circuit 5) is opened when the load elevator moves to its lowered position. If the cases are being handled exceptionally fast, a new layer of cases may be released and moved onto the layer stripper before the table is in its upper position. In this case contacts LS–10A in circuit 4 are opened and relay B is de-energized. Contact B–1 in circuit 16 opens, de-energizing stripper brake 682 and preventing the energization of clutch 680. As a result, the new layer remains on the layer stripper until the load table reaches its uppermost position, closing contacts LS–1A (circuit 6), whereby relay B is again energized. When this safety circuit is incorporated in the machine, it is necessary to provide a fixed track at the forward end of the machine so that, when the leading roller 600B reaches the forward end of the stripping zone, it will be raised out of engagement with the chain that drives it.

Referring again to FIG. 11, it will be appreciated that the gears and sprockets should be chosen so that the various operations are carried out smoothly. In one successful installation, the drive components were so chosen that, when the motor M1 was operated at 505 r.p.m., the various shafts rotated at approximately the following speeds: shaft 907 at 232 r.p.m., shaft 908 at 183 r.p.m., shaft 911 at 183 r.p.m., shaft 631 at 152 r.p.m., shaft 673 at 152 r.p.m., and shaft 642 at 38 r.p.m. The stripper rollers 600 of the layer stripper carriage had an outside diameter of 1.25", their drive sleeves 610 had an outside diameter of 1,625", and they had a peripheral speed of 128 f.p.m. The lead roller 600B had an outside diameter of approximately 1.375" and was rotated at 271 r.p.m. When the layer stripper carriage was moved rearwardly to strip the layer therefrom, it moved at about 61.3 f.p.m.

From the foregoing description it will be evident that the present invention provides a stripper carriage for a pallet loading machine which is provided with a simple and effective means for actuation and deactuation regardless of the nature of the particular articles being loaded upon the pallets. The carriage, which is comprised basically of rollers adapted to be pulled out from under the layer of articles to be loaded, also includes a roller which is provided with sensing fingers performing the functions of sensing both the completion of the loading of the carriage and the completion of the unloading of the carriage. Since the sensing means are an integral part of the stripper carriage itself, rather than being located on the machine structure apart from the carriage, they can handle loads of indeterminate sizes thereby providing the stack loading apparatus with considerable versatility.

It will be understood that modifications and variations may be made without departing from the scope of the present invention.

Having thus described my invention, what I claim as new and desire to protect by Letters Patent is:

1. In an article handling apparatus, a stripper carriage including a rotatable roller at the forward end portion of said carriage, at least one finger projecting upwardly from said roller in the path of articles being moved toward the forward end of said carriage, counterbalance means urging said finger to upright position, means for advancing a formation of articles forwardly onto said carriage to engage said finger and rotate said roller, electrical power means for moving said stripper carriage rearwardly out from beneath said articles, spring means resisting the rearward movement of said stripper, a control circuit for said power means, a switch in said circuit, rotation of said roller in response to contact of said finger by an article being effective to actuate said switch to condition said circuit for energization of said power means to move said carriage rearwardly, and reverse rotation of said roller by said counterbalance means when the articles are stripped off said finger being effective to actuate said switch to effect de-energization of said power means and return of said carriage forwardly by said spring means.

2. In a machine for stacking layers of articles, a stripper carriage for receiving a layer of articles and for depositing it upon an underlying structure, said carriage comprising a plurality of rollers for moving said articles forwardly over said carriage, one of said rollers at the forward end of said carriage having a finger projecting radially outwardly therefrom in the path of articles being moved toward the forward end of said carriage, counterbalance means normally urging said one roller into a rotated position wherein said finger is generally in an upright position to intercept said articles, means for advancing said layer of articles forwardly onto said carriage to engage said finger and thereby cause rotation of said one roller, means for moving said stripper carriage rearwardly out of its supporting position beneath said layer of articles, means for returning said stripper carriage to its supporting position, and control means for effecting the actuation of said last two named means, said control means being operatively associated with said one roller whereby rotation of said one roller in response to contact of said finger by an article is effective to actuate said means for moving said stripper carriage rearwardly and whereby reverse rotation of said one roller by said counterbalance means when the articles are stripped off said finger is effective to actuate said means for returning said stripper carriage to its article supporting position.

3. In a machine for stacking layers of articles as set forth in claim 2 wherein said means for moving said stripper carriage rearwardly comprises a power drive means energized through an electrical circuit and wherein said control means includes a switch actuated in response to rotation of said one roller, said switch conditioning said electrical circuit to operate said power drive means.

4. In a machine for stacking layers of articles as set forth in claim 3 including a lever arm connected to said one roller, said lever arm being operatively associated with the actuating arm for said switch, and said counterbalance means comprising a spring for urging said lever arm to its normal rotative position wherein said finger is in said generally upright position.

References Cited

German printed application, 1,108,145, May 31, 1961.

GERALD M. FORLENZA, Primary Examiner
ROBERT J. SPAR, Assistant Examiner

PO-1050
(5/69)

UNITED STATES PATENT OFFICE
CERTIFICATE OF CORRECTION

Patent No. 3,471,038          Dated  December 17, 1970

Inventor(s) E. A. VERRINDER

It is certified that error appears in the above-identified patent and that said Letters Patent are hereby corrected as shown below:

Column 2, line 25, change the comma to a period; line 32, chang "the" to --a--. Column 5, line 49, change "I" to --T--. Colum 6, line 70, change "opposite" to --opposed--. Column 7, line 1 change "thee" to --the--; line 23, change "transformed" to --transferred--; line 24, capitalize "Sterling Gear Motor"; lin 46, change "Fig. 33" to --Fig. 12--. Column 9, line 51, change "berotated" to --be rotated--. Column 10, line 2, after "due" insert --to--.

**SIGNED AND
SEALED
MAR 9 1971**

(SEAL)
Attest:

Edward M. Fletcher, Jr.
Attesting Officer

WILLIAM E. SCHUYLER, JR.
Commissioner of Patents